Oct. 22, 1929.   F. BADELL   1,732,961
HYDROMETER
Filed Jan. 10, 1927
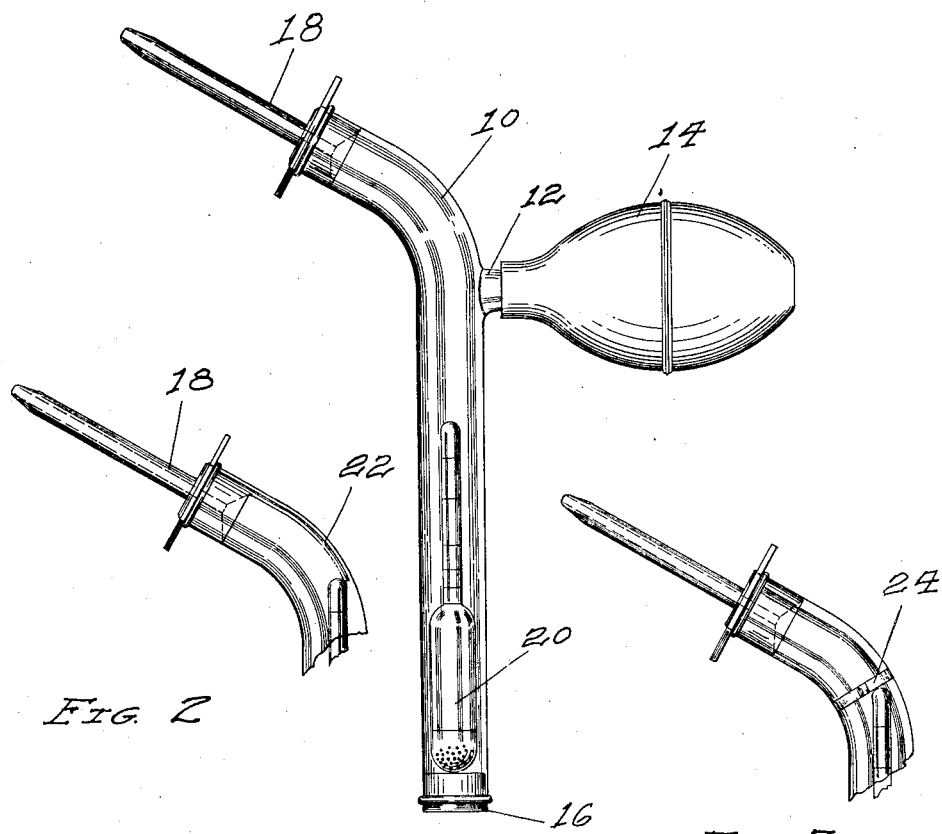
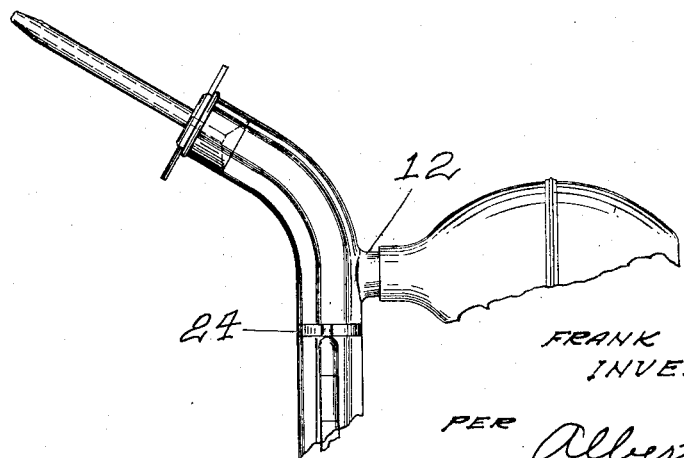
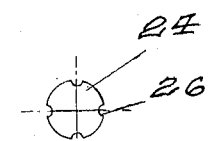
FRANK BADELL
INVENTOR
PER Albert J Pike
ATTORNEY.

Patented Oct. 22, 1929

1,732,961

UNITED STATES PATENT OFFICE

FRANK BADELL, OF CICERO, ILLINOIS, ASSIGNOR TO E. EDELMANN & CO., OF CHICAGO, ILLINOIS, A CORPORATION OF ILLINOIS

HYDROMETER

Application filed January 10, 1927. Serial No. 160,088.

This invention relates to improvements in hydrometers, particularly for use in testing battery solutions, and has for one of its principal objects the provision of a hydrometer which shall be drip proof.

One of the important objects of this invention is to provide, in a hydrometer for testing the strength of various solutions, particularly battery solutions, means for taking up a required quantity of liquid from a battery or the like and positioning the same in a float chamber for ready and accurate observation.

Still another important object of this invention is to provide, in a hydrometer, means for maintaining contained liquids the specific gravity of which is to be tested, in a leakproof chamber while said test is being carried out.

Other and further important objects of the invention will be apparent from the disclosures in the accompanying drawings and following specification.

The invention, in a preferred form, is illustrated in the drawings and hereinafter more fully described.

In the drawings:

Figure 1 is a vertical elevation of the improved hydrometer of this invention.

Figure 2 is a detail view of the nozzle showing a slight modification.

Figure 3 is another detail view showing a slightly different adaptation of the invention.

Figure 4 is a still further detail view illustrating another modification.

Figure 5 is a side elevation of the washer shown in Figures 3 and 4.

As shown in the drawings:

The reference numeral 10 indicates generally a piece of glass tubing or the like which forms the main body portion of the improved hydrometer of this invention.

Welded into the glass of the tube at or near the upper end thereof, which is bent, as shown, is a nipple 12 adapted for the reception of a rubber bulb or the like 14 by means of which liquids may be drawn into the apparatus.

The lower end of the chamber 10 is closed by means of a plug 16 or the like, and at the upper end is attached a nozzle 18. In the device shown in Figure 1 the liquid is drawn into the body 10 when the end of the nozzle 18 is inserted into the body of liquid, and the specific gravity thereof is then ascertained by means of the usual float 20.

As shown in Figure 2, an inwardly extending flap 22, preferably of rubber, and integral with the plug of the nozzle 18 is provided to form a cushion against which the end of the float 20 contacts when the device is emptied, thereby eliminating any possibility of breaking of the stem of the float and also any possibility of it sticking in the bent end of the chamber 10.

This same result is accomplished by means of a rubber plug 24, as shown in Figures 3 and 4, this rubber plug being adapted to be positioned either above or below the nozzle 12, as desired. In order to provide for a suitable inflow of liquid past the float 24 openings 26 are formed in the edges thereof, as shown in Figure 5, and it is obvious that this plug may be made of any desired or suitable thickness so that it will not become displaced.

It will be evident that herein is provided a hydrometer syringe which is of extremely simple construction, economically manufactured, and readily operated. Further, it is absolutely drip-proof, as when the liquid is being tested for specific gravity it is at the end of the hydrometer remote from the nozzle, the nozzle being open and extending upwardly. As used in the maintenance of radio batteries this feature is especially important, as such batteries are usually kept near rugs or the like, which are quite expensive and which are readily spoiled if even a single drop of acid falls thereon.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A hydrometer, comprising a tube closed at one end, float means within the tube, a nozzle at the other end, and suction means adjacent the middle of the tube.

2. A hydrometer comprising a substantially cylindrical tube, float means within the tube, a plug fitted to close one end of said tube, a nozzle fitted at the remaining end, and suction means adjacent the middle of the tube.

3. A hydrometer comprising a cylindrical tube slightly bent at one end and closed at the other, a nozzle fitted at the bent end of the tube, a float inserted to move within the straight portion of the tube, and suction means adjacent the middle of the tube.

4. A hydrometer comprising a tube closed at one end and having its remaining end bent to extend angularly, a nozzle at the bent end, suction means adjacent the middle of the tube, a float inserted to move in the straight portion of the tube, and stop means for preventing the float from entering the bent portion of the tube sufficiently to wedge therein.

5. A hydrometer comprising a substantially cylindrical tube closed at one end and having its remaining end bent to extend angularly, a nozzle at the bent end, suction means adjacent the middle of the tube, a float inserted to move in the straight portion of the tube, and means inserted within the bent portion of the tube to limit movement of the float to keep the same from entering the bent portion to become wedged therein.

6. A hydrometer comprising a tube closed at one end and bent angularly adjacent the remaining end, a nozzle at the bent end, suction means adjacent the middle of the tube, a float element inserted to move in the straight portion of the tube, and a grooved plug mounted in the bent portion of the tube to limit movement of the float element into said bent portion.

7. A hydrometer comprising a substantially cylindrical tube bent angularly adjacent one end, a nozzle fitted at said bent end, a closure member fitted at the remaining end of the tube, suction means connected laterally with said tube adjacent the middle thereof, a float element inserted to move in the straight portion of the tube and a grooved plug mounted in said tube to prevent the entrance of said float element into the bent portion of the tube to become wedged therein.

8. A hydrometer comprising a tube closed at one end and provided with a laterally extending connecting nipple adjacent its middle portion, float means within the tube, a nozzle at the other end of said tube, and a suction bulb fitted on the connecting nipple.

In testimony whereof I affix my signature.

FRANK BADELL.